MARK POTTER.

Improvement in Poultry Coops.

No. 125,142. Patented April 2, 1872.

WITNESSES:
A B Richmond
Roe Reisinger

INVENTOR:
Mark Potter 125,142

UNITED STATES PATENT OFFICE.

MARK POTTER, OF GIRARD, PENNSYLVANIA.

IMPROVEMENT IN POULTRY-COOPS.

Specification forming part of Letters Patent No. 125,142, dated April 2, 1872.

*To all whom it may concern:*

Be it known that I, MARK POTTER, of Girard, in the county of Erie, State of Pennsylvania, have invented a new and Improved "Vermin-Proof Folding Poultry-Coop;" and I do hereby declare that the following is a full and exact description of the same, reference being had to the accompanying drawing and the letters of reference marked thereon.

The object of my invention is to construct a coop in such a manner that it will be perfectly vermin-proof—that is, that no rats, weasels, or other animal can get into it without being caught in a trap—and also to construct it in such a manner that when not in use it can be folded into a small space, that it may be easily packed away for future use.

Figure 3:
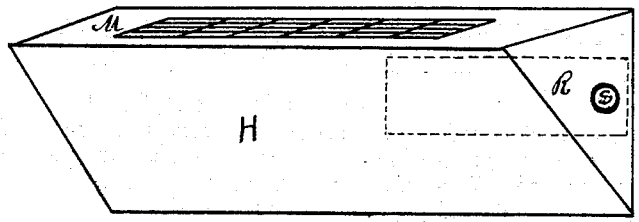
Figure 2:
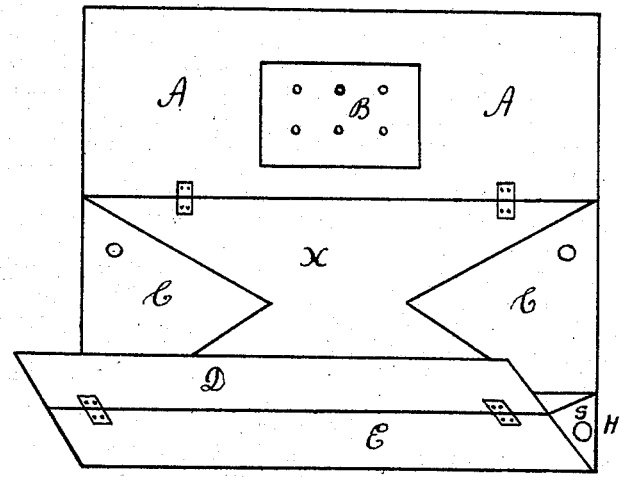
Figure 1:
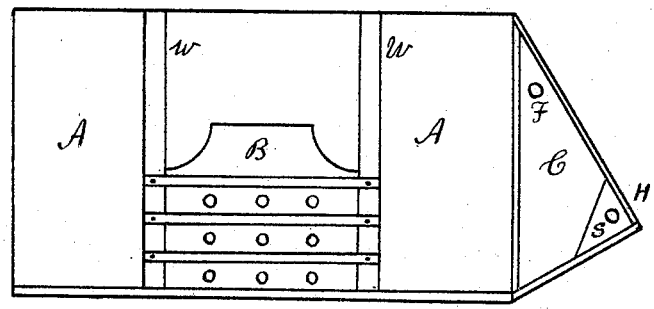

Figure 1 represents my coop "set up" for use. It is constructed in a triangular form. A A is the front, in which is a metal door, B, perforated with holes for ventilation at night when the door is shut down. This door slides in the cleats $w$ $w$ placed on the front, as shown in the drawing. The ends C C are hinged to the back $x$, (see Fig. 2,) so that they can be folded down, as shown in the drawing. The bottom D E is also hinged together in two equal parts for the same purpose. H is trap, separated from the coop by a partition of wire-gauze, as shown at M, Fig. 3, which shows the trap separated from the coop. S is a hole in the end of the trap for vermin to enter. R, Fig. 3, represents a thin flexible spring of metal attached to the end of the trap above the hole S. The inner end of the spring drops down and rests on the floor of the trap. If a rat or weasel enters the trap through the hole S he pushes or raises the spring up, and as he crawls in the spring drops behind him and shuts him in, as he cannot raise the spring from the inside. This trap should be lined with sheet metal. F, Fig. 1, is a hole covered with wire-gauze for a ventilator.

This coop, constructed as described, is vermin-proof, and at the same time well ventilated, and is also a trap, as described.

What I claim as my invention, and desire to secure by Letters Patent, is as follows, to wit:

A coop constructed as described, in combination with the trap H, when the same are in the aforesaid combination, for the purposes set forth.

MARK POTTER.

Witnesses:
   A. B. RICHMOND,
   ROE REISINGER.